(No Model.) 4 Sheets—Sheet 2.
T. R. HOUSEMAN & C. B. M. SPROWLES.
PROCESS OF DESICCATION.
No. 413,232. Patented Oct. 22, 1889.
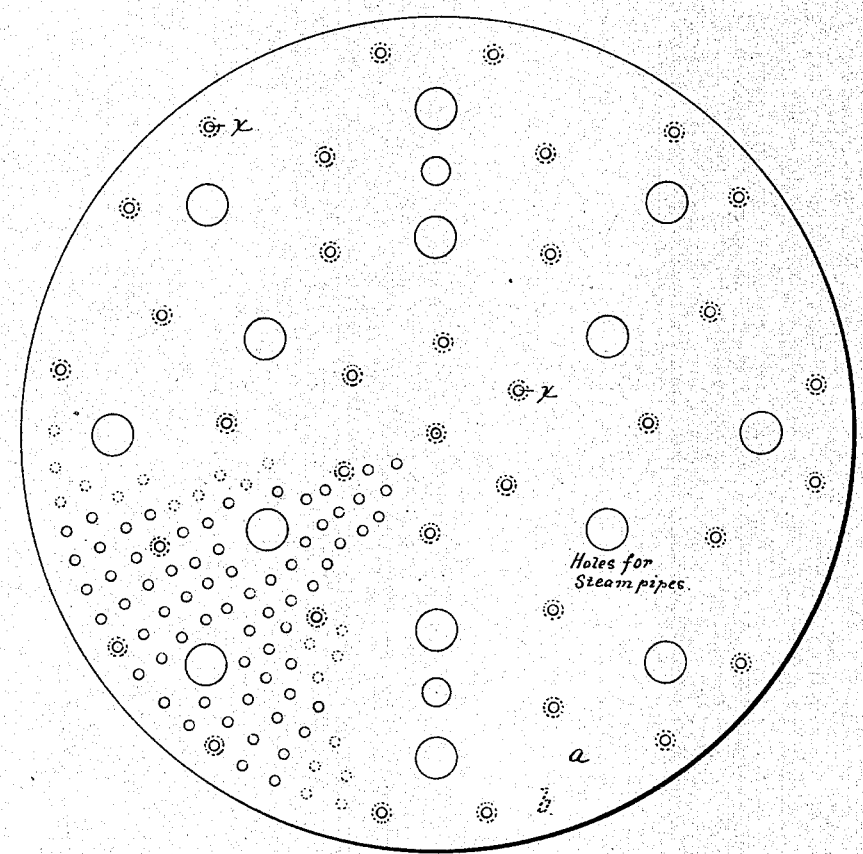
Fig 2
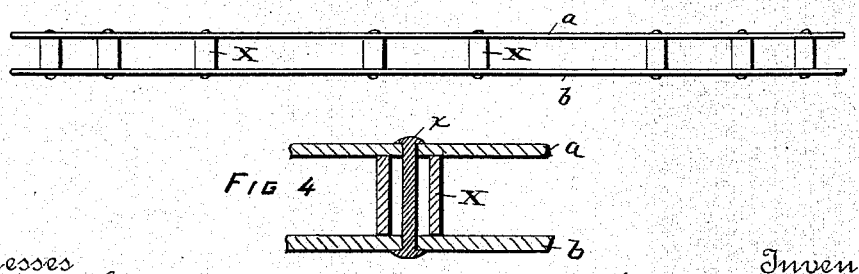
Fig 3
Fig 4

(No Model.) 4 Sheets—Sheet 3.

T. R. HOUSEMAN & C. B. M. SPROWLES.
PROCESS OF DESICCATION.

No. 413,232. Patented Oct. 22, 1889.

(No Model.) 4 Sheets—Sheet 4.
T. R. HOUSEMAN & C. B. M. SPROWLES.
PROCESS OF DESICCATION.
No. 413,232. Patented Oct. 22, 1889.
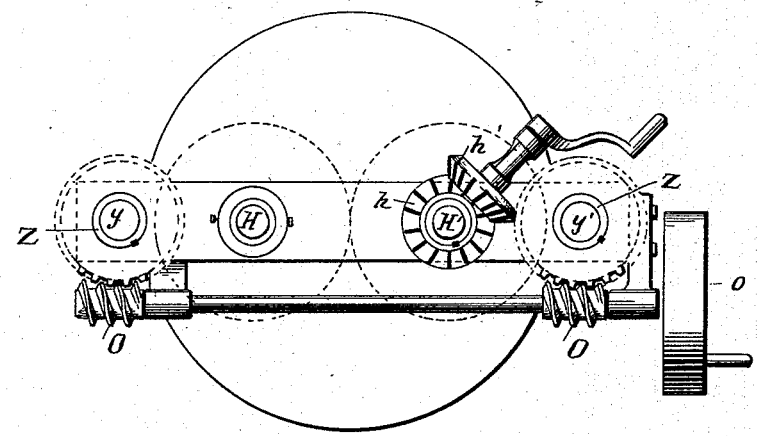
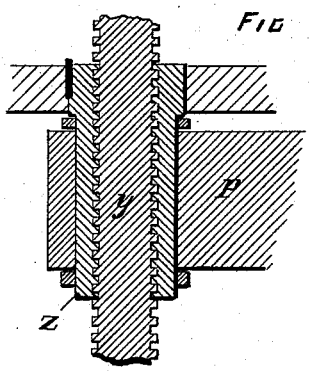
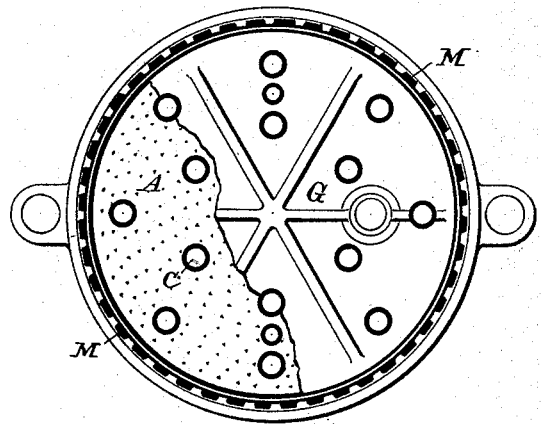
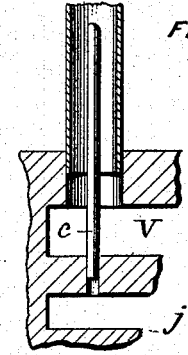
Witnesses
R. B. Shepherd
W. G. Harding
Inventor
Thomas R. Houseman
and Christian B. M. Sprowles
By their Attorney
G. F. Harding

UNITED STATES PATENT OFFICE.

THOMAS R. HOUSEMAN AND CHRISTIAN B. M. SPROWLES, OF PHILADELPHIA, PENNSYLVANIA, ASSIGNORS TO THE UNITED STATES FOOD FERTILIZER AND MANUFACTURING COMPANY, OF PENNSYLVANIA.

PROCESS OF DESICCATION.

SPECIFICATION forming part of Letters Patent No. 413,232, dated October 22, 1889.

Application filed September 21, 1887. Serial No. 250,307. (No model.)

*To all whom it may concern:*

Be it known that we, THOMAS R. HOUSEMAN and CHRISTIAN B. M. SPROWLES, of the city and county of Philadelphia, State of Pennsylvania, have invented a new and useful Process of Desiccation, of which the following is a true and exact description, due reference being had to the drawings, in which is illustrated one apparatus by which our invention is carried out.

Our invention consists in the desiccation and treatment of waste materials—such as garbage, slops, waste brewers' grain, &c.—so as to extract all the moisture from such materials and saving the liquor and the solid material thus obtained and using it for various purposes, which before treatment by this process are in a state that would be entirely worthless. If the solid material obtained is from garbage or slops, &c., it can be ground up and used as a fertilizer and the fats and oils rendered from the liquor.

Heretofore the processes for desiccation have been carried on by means of either heat or pressure; and our improved process consists in treating the mass to be desiccated by pressure, at the same time heating it throughout the mass either by means of hot air or steam, but in such a way that no moisture can be absorbed from the heating agent. The heating of the mass throughout prevents any secretion of moisture and assists in the desiccation, and also where the material contains oleaginous matter the heat prevents this oleaginous matter from congealing and allows it to be compressed out of the material to be desiccated.

This process is especially adapted for saving products which would be spoiled unless deprived of their moisture. The process can be readily understood by reference to the apparatus illustrated in the accompanying drawings. We reserve the right to have this apparatus form the subject-matter of another patent, for which we are about to apply.

Figure 1:
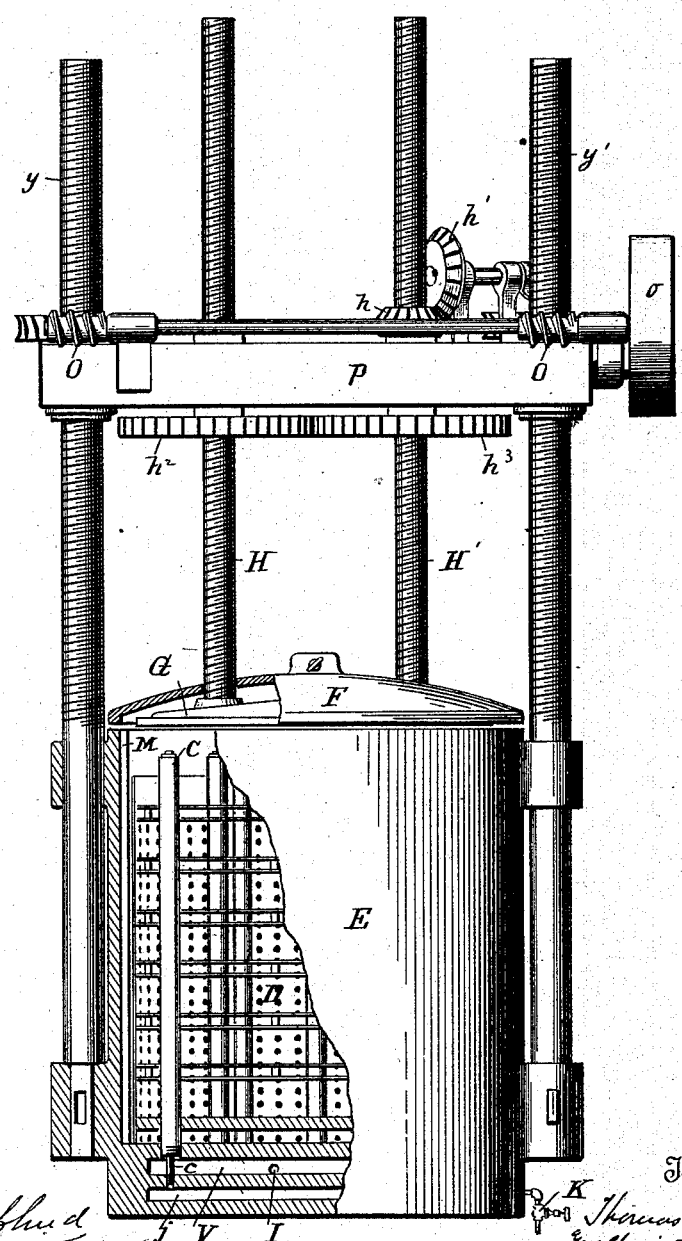
Figure 5:
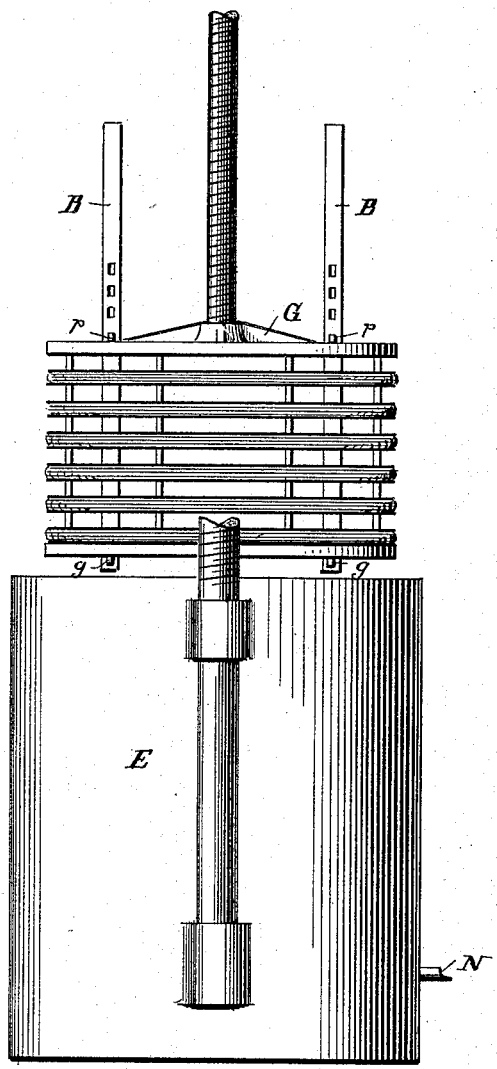

In the drawings, Figure 1 represents a view of the entire apparatus with a portion of the outer surface and a portion of the inner perforated cylinder removed. Fig. 2 represents a plan view of the receptacle in which the material to be desiccated is placed. Fig. 3 represents a vertical section of the receptacle in which the material is placed. Fig. 4 represents the supports and divisions shown at $x$, Fig. 3. Fig. 5 represents a view of the machine, showing the receptacles withdrawn. Fig. 6 represents a plan view from the top of the apparatus below the mechanism for causing compression. Fig. 7 represents a plan view of top of the entire apparatus, showing the gearing for operating the compressing mechanism and removing the receptacles. Fig. 8 represents a section of the screws and cross-beam shown in Fig. 1, left-hand side. Fig. 9 is a detail view of the steam-pipe, showing the method of removing the condensed steam.

The construction is as follows:

Referring to Fig. 5, A A A A A A are a series of doubly-perforated disks. (Shown in detail in Fig. 2.) These plates are held in position by the bars B, which pass through them, and the upper and lower disks of each set of disks are separated by the projections $x$ shown in Fig. 3 and in detail in Fig. 4. Fig. 1 shows these disks in the apparatus ready for use.

In Fig. 1, C represents a series of steam-pipes which pass up through these disks. These pipes are closed at the top, but have an interior pipe $c$, which reaches to the desired height in the steam-pipe, as shown in detail in Fig. 9, by which the condensed steam is carried off. Hot air may be passed through the pipes C in place of the steam.

Surrounding the receptacles and the steam-pipes before mentioned is a perforated shell D, and surrounding this perforated shell D is a solid shell E. A cap or covering is placed on the top of the apparatus. A plunger G (shown in Fig. 5) rests on the top of the receptacle. These receptacles may be of any number, dependent upon the height of the apparatus. The plunger G is connected to the screws H H', which in turn are operated by the bevel-gear $h$ $h'$ and spur-wheels $h^2$ $h^3$.

The operation is as follows: The material to be desiccated is placed on the receptacles until the desired amount is reached, when the receptacles are lowered to the bottom of the apparatus in the position shown in Fig. 1. The steam or other heat is then turned on and enters the chamber V through the opening I and passes up through the pipes C, and if steam be used the condensed steam returns, as before described, and falls into the condensing-chamber $j$, and is drawn off by the tap K. The piston is caused to operate upon the receptacles by means of the bevel-gear $h\ h'$ and spur-wheels $h^2\ h^3$ and compresses the receptacles, forcing out the liquid, while the heat assists in the desiccation. The liquid is forced up and down and falls between the upper and lower surfaces of the disks, whence it is carried by the vertical channels M M, (shown in Figs. 6 and 1,) formed upon the inner periphery of the outer casing of the apparatus and runs out of the spout N, Fig. 5.

When the bevel-gear is not of sufficient power to cause the required compression, I add the worm-gearing O O, (shown in Fig. 1,) operated by wheel $o$. A beam P connects these two worm-gearings, and through this beam the screws H H' pass and fit so as to travel up without lifting the beam. The hub of the worm-wheel Z Z' passes through the outer ends of this beam, and it is internally threaded, through which the screws $y\ y'$ pass, as shown in Fig. 8, and when the worm-gearing is operated the beam is elevated or depressed, carrying with it the screws H H' and the plunger G, and thereby a more powerful compression may be obtained.

We do not intend to limit ourselves to this or any particular apparatus by which our process may be carried out; but

What we claim, and desire to protect by Letters Patent, is—

A process for the desiccation of substances, which consists in compressing the substance and at the same time heating it by a dry heat throughout its mass.

THOMAS R. HOUSEMAN.
CHRISTIAN B. M. SPROWLES.

Witnesses:
BUTLER KENNER HARDING,
FRANK CROWNE.